US008357289B2

(12) United States Patent
Pruet

(10) Patent No.: US 8,357,289 B2
(45) Date of Patent: Jan. 22, 2013

(54) METHOD AND SYSTEM FOR REMOVING CONTAMINANTS FROM A FLUID

(75) Inventor: Randall Boyd Pruet, Hellerup (DK)

(73) Assignee: Chevron U.S.A. Inc., San Ramon, CA (US)

( * ) Notice: Subject to any disclaimer, the term of this patent is extended or adjusted under 35 U.S.C. 154(b) by 1198 days.

(21) Appl. No.: 12/118,815

(22) Filed: May 12, 2008

(65) Prior Publication Data

US 2009/0277797 A1 Nov. 12, 2009

(51) Int. Cl.
*C02F 1/461* (2006.01)
*C25D 13/12* (2006.01)

(52) U.S. Cl. ........................................ 205/753; 204/483

(58) Field of Classification Search .................. 204/164, 204/168, 562, 572, 483; 205/753

See application file for complete search history.

(56) References Cited

U.S. PATENT DOCUMENTS

| | | | | | |
|---|---|---|---|---|---|
| 3,799,855 | A | | 3/1974 | Franse | |
| 3,928,158 | A | | 12/1975 | Fritsche et al. | |
| 4,009,089 | A | | 2/1977 | Crissman et al. | |
| 4,059,498 | A | | 11/1977 | Crissman et al. | |
| 4,581,112 | A | | 4/1986 | Mintz et al. | |
| 5,569,388 | A | * | 10/1996 | Kubo | 210/764 |
| 5,770,089 | A | * | 6/1998 | Kubo | 210/661 |
| 7,081,192 | B1 | | 7/2006 | Wang et al. | |
| 2003/0015428 | A1 | | 1/2003 | Becker et al. | |

FOREIGN PATENT DOCUMENTS

| | | | |
|---|---|---|---|
| EP | 0 570 108 | A2 | 11/1993 |
| GB | 2 098 887 | A | 12/1982 |

OTHER PUBLICATIONS

3M Glass Microspheres, Floated Product Series, 7 pgs, obtained from http://multimedia.3m.com/mws/mediawebserver?66666UuZjcFSLXTt5X&6m8s6EVuQEcuZgVs6EVs6E666666.

Metal Coated Microspheres—General Information, obtained from http://www.microspheretechnology.com/cat-metal.php.

Introduction to Microspheres—What are Microspheres?, obtained from http://www.microspheretechnology.com/learn-intro.php.

PCT International Search Report and Written Opinion, International App. No. PCT/US2009/041608, Sep. 16, 2009.

* cited by examiner

*Primary Examiner* — Kishor Mayekar

(74) *Attorney, Agent, or Firm* — Richard J. Schulte

(57) ABSTRACT

A method and system for removing contaminants from a fluid are provided. The method can generally include providing microstructures in the fluid. At least some of the contaminants in the fluid are attracted to the microstructures and adhered to the microstructures. With the contaminants attached to the microstructures, the microstructures can be separated from the fluid so that the contaminants are thereby removed from the fluid.

20 Claims, 7 Drawing Sheets

METHOD AND SYSTEM FOR REMOVING CONTAMINANTS FROM A FLUID

BACKGROUND OF THE INVENTION

1. Field of the Invention

This invention relates to the cleaning of fluids, such as for the removal of oil and other contaminants from produced water that results from a hydrocarbon production operation.

2. Description of Related Art

With the production of crude oil and other hydrocarbons, there is normally an associated aqueous stream of produced water that results, the produced water typically including a variety of contaminants, e.g., dissolved and/or suspended materials such as one or more of the following: oil or other hydrocarbons; minerals, such as calcium, boron, carbonates, chlorides, hydroxides, sulfates, iron, magnesium, sodium, silicates, and nitrates; organic materials, such as formate, acetate, propionate, butyrate, and valerate; and the like. The contaminants can include solid, liquid, or gaseous phases, typically of material that is immiscible in the fluid. There is an increasing interest in facilitating the removal of contaminants from the produced water and reducing the quantities of contaminants that are released to the environment by or during the disposal of this stream. In some cases, there is an increased interest in removing both the suspended solids and dissolved hydrocarbon (or other materials that may feed organisms in the water) so that this water can be reinjected to enhance oil recovery with less damage to the reservoir than untreated water.

Conventional methods for treating produced water and other contaminated fluids to remove contaminants therefrom include the use of settling and filtering operations and chemical additives (e.g., ion exchange resin beds, scavengers, adsorption processes). For example, in one conventional method, a stream of produced water is passed through a separation vessel, where hydrocarbon particles in the water can rise to the surface. The time required for separation in a separation vessel depends on such factors as the size of the hydrocarbon particles, the temperature of the fluid, the character of the flow, and the like. An effective separation operation can require a large vessel and, when reasonable separation times are used, typically does not result in separation of small hydrocarbon particles, such as those having a diameter less than about 100 micron, which tend to rise or settle slowly.

Another conventional method for removing small oil particles from an aqueous stream includes the use of chemicals and gas flotation aids, such as bubbles, as described in U.S. Pat. No. 5,543,043. Chemical polymer can also be added to increase the efficiency of clarification. Polymers that may be used are typically of high molecular weight, long branched chain with many charged side branches. These charged side branches attract charged particles such as oil and suspended solids. Assisted by gas flotation, the polymer and entrained particles migrate to the surface of the water, thereby forming a foaming floc that can be removed by skimming the surface. The oily floc is normally not economical to recover and must be disposed of as a waste. For a dispersed gas flotation unit, the mean generated gas bubble size can typically range from about 80 to 100 micrometers. Even if the bubbles are optimally sized, the bubbles tend to rise, collide, and combine to form larger bubbles, which are less effective in removing the contaminants.

While conventional methods have proven successful for removing at least some contaminants, a continued need exists for improved methods and systems for removing contaminants from produced water and other contaminated fluids.

SUMMARY OF THE INVENTION

The embodiments of the present invention generally provide systems and methods useful for removing contaminants from a fluid by introducing solid microstructures into the fluid. The fluid can be a stream of produced water, as typically results from a hydrocarbon production operation, or another well-mixed stream of a fluid with a contaminant, such as a fluid that contains a first component (e.g., water) and one or more immiscible second components as contaminants (e.g., oil).

The microstructures, which are not soluble in the fluid or its components, can have a bulk density that is either greater or less than the densities of the fluid (and each of its components). Further, the surface of the microstructures can be attractive to the contaminant. For example, if the fluid is produced salt water that contains crude oil as a contaminant, and if the microstructures are formed of glass, the oil will be preferentially attracted to wet the solid. With the microstructures present in the fluid, the contaminants can be attracted and attached to the microstructures, and the microstructures can carry the contaminants for separation, e.g., by rising or falling in the fluid due to the density of the microstructures being different from the fluid. Even if the particles of contaminant have a density different than that of the pure fluid, the use of the microstructures can facilitate the removal of the contaminants due to the more significant difference in density between the microstructures and the fluid and due to the ability of the microstructures to retain the contaminants and thereby prevent the contaminants from flowing with the fluid.

In some cases, the microstructures can facilitate the removal of contaminants without significant uses of chemicals, thereby reducing costs and also avoiding the generation of a chemical emulsion that results when chemicals are used to bond to the contaminant, and which generally must be disposed. In some cases, contaminant, such as oil, that is removed from the fluid can be recovered and processed, sold, or otherwise used. Further, in some cases, the microstructures can increase the buoyancy of oil or other contaminant particles in the fluid such that contaminant particles with diameters as small as 10 microns, or smaller, can be removed without requiring unreasonable settling times.

According to one embodiment of the present invention, there is provided a method that includes providing a plurality of microstructures in the fluid. The microstructures can be provided as hollow, generally spherical glass microstructures having an overall density less than the fluid and/or water, and the microstructures can be coated or uncoated. An electric charge is provided on the microstructures (e.g., by the nature of the surface composition and/or internal composition or by electrical charging) so that at least some of the contaminants in the fluid are attracted to the microstructures and adhered to the microstructures. The microstructures with the contaminants attached thereto are separated from the fluid so that the contaminants are thereby removed from the fluid, e.g., to remove liquid hydrocarbon and/or solid contaminants from the fluid with the microstructures. Subsequent to the separation of the microstructures (and contaminants) from the fluid, the microstructures can be cleaned to remove the contaminants from the microstructures, and the microstructures can be re-used to remove additional contaminants from the fluid.

According to another embodiment of the present invention, there is provided a system for removing contaminants from a fluid. The system includes a container configured to receive the fluid and a plurality of microstructures disposed in the container. An anode and a cathode are structured to contact the fluid in the container and provide an electric charge through the fluid such that an electric charge is provided on the microstructures and at least some of the contaminants in the fluid are attracted to the microstructures and adhered to the microstructures. A port is provided for discharging the fluid without the microstructures from the container so that the microstructures with the contaminants attached thereto are separated from the fluid and the contaminants are thereby removed from the fluid. The microstructures can be hollow, generally spherical glass devices that have an overall density less than the fluid and/or water, and a coating (which can be bonded covalently or otherwise to the surface of the microstructures) can be provided on the outer surface of the microstructures. In some cases, a regeneration device can be configured to receive the microstructures with the contaminants adhered thereto and remove the contaminants from the microstructures so that the microstructures are cleaned and configured for re-use in the container for removing additional contaminants from the fluid.

BRIEF DESCRIPTION OF THE DRAWINGS

Figure 1:
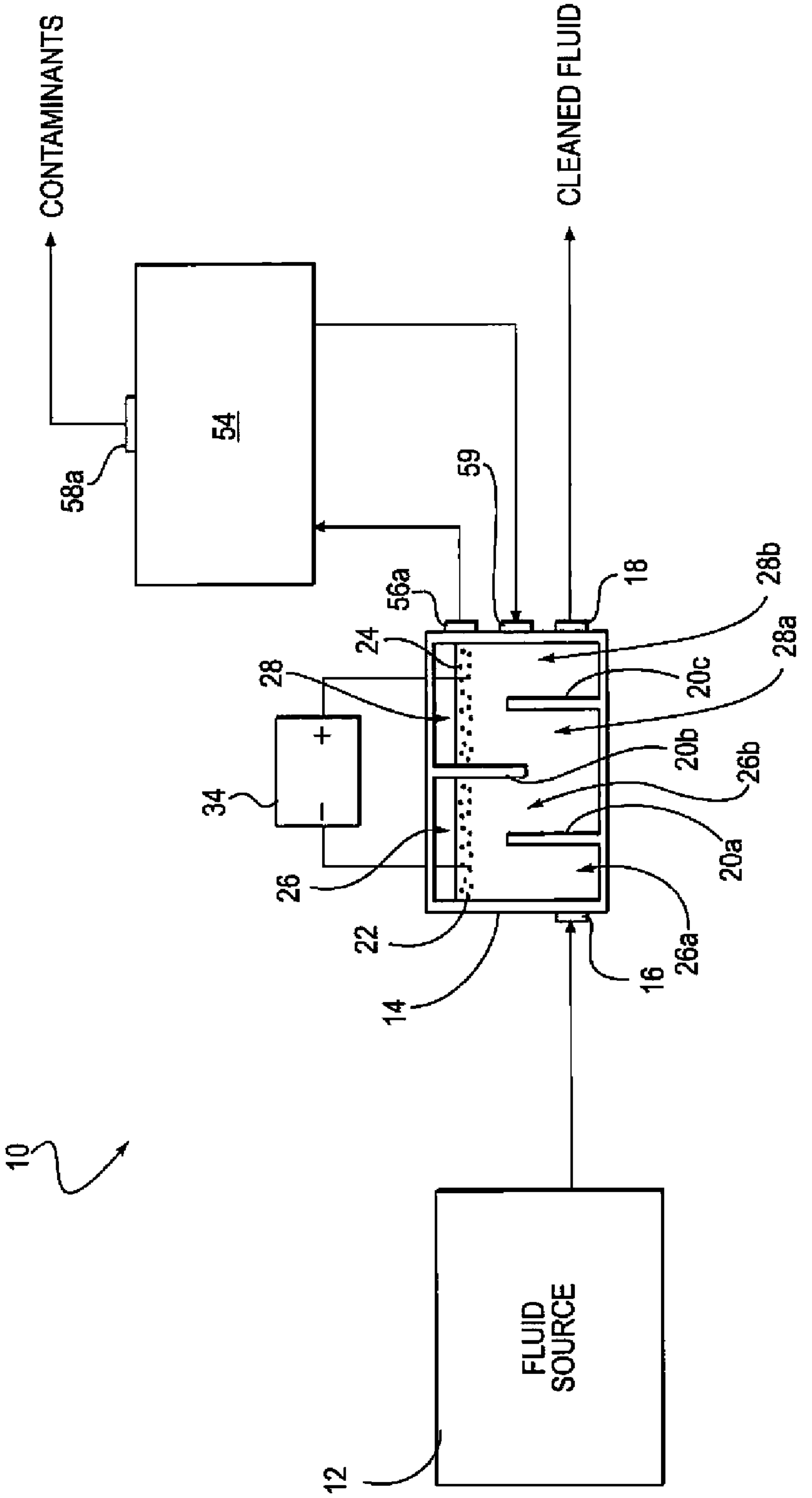
Figure 2:
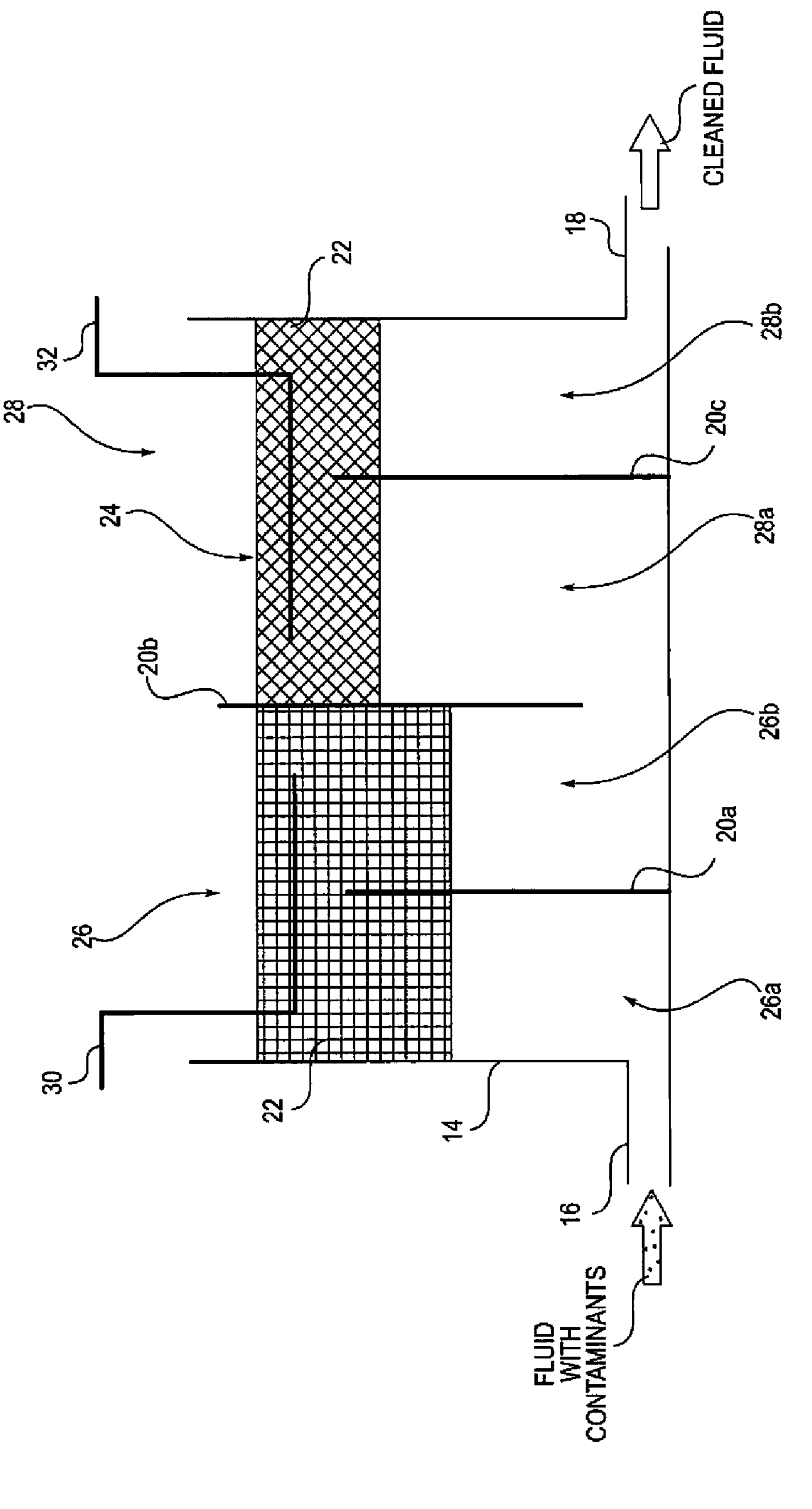
Figure 2A:
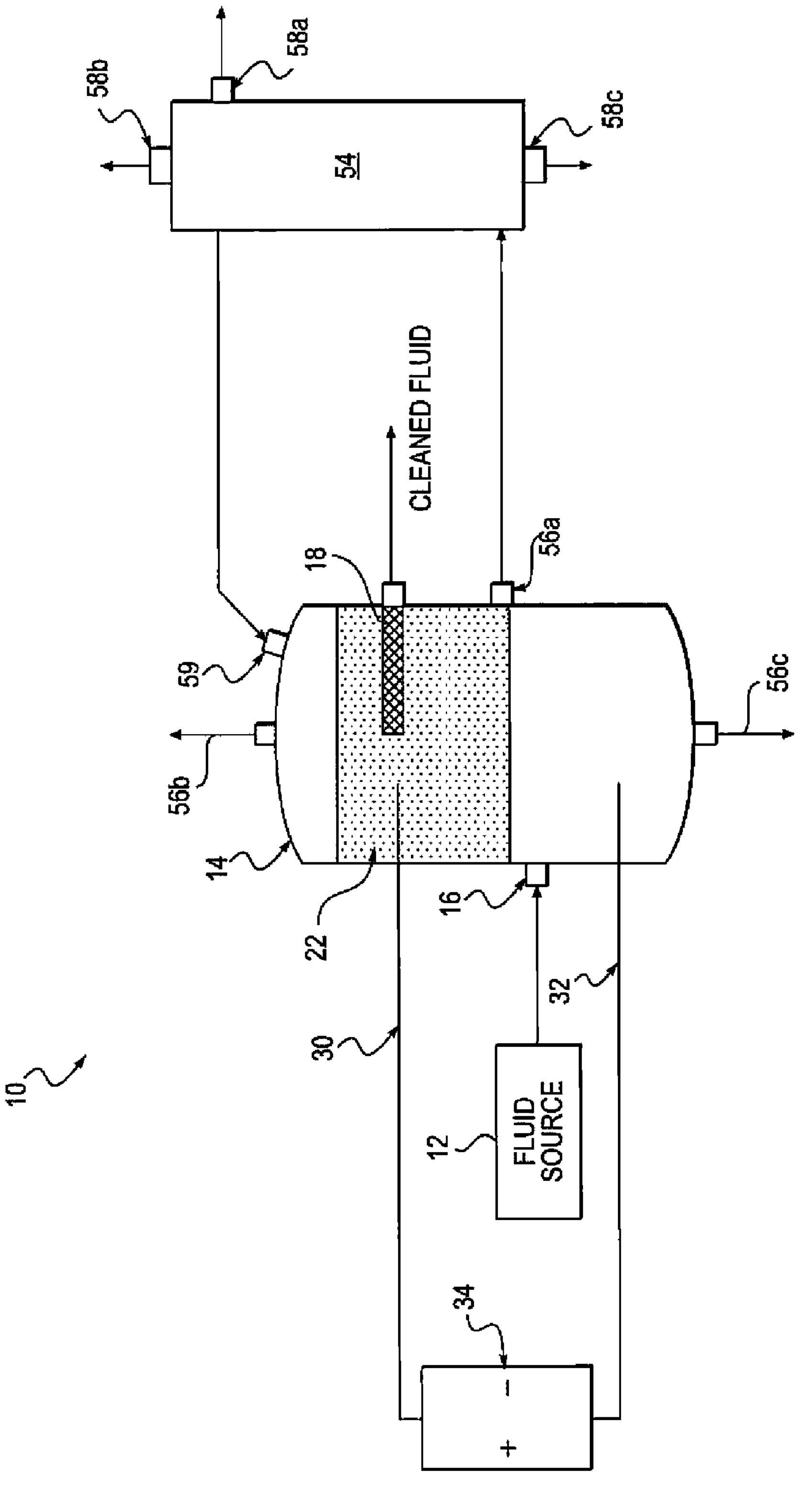
Figure 3:
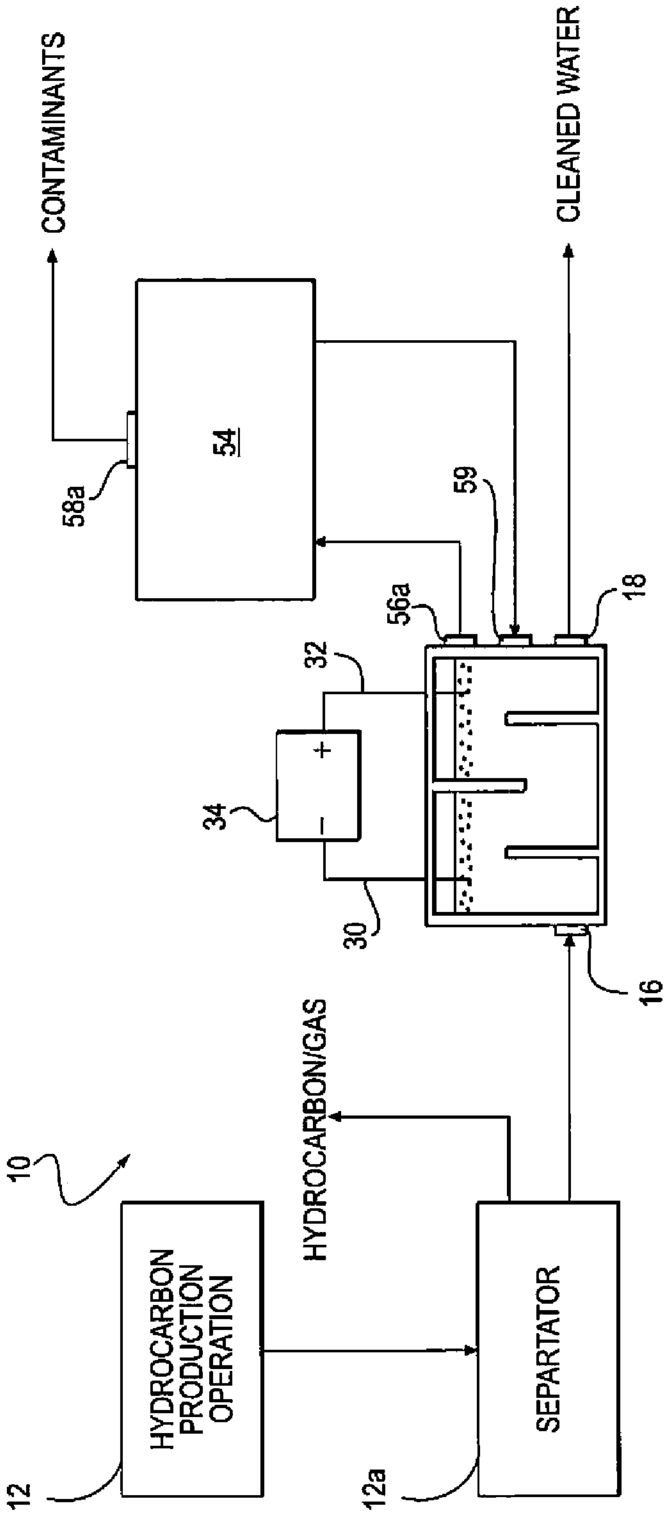
Figure 4:
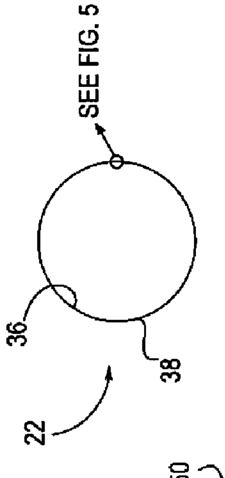
Figure 5:
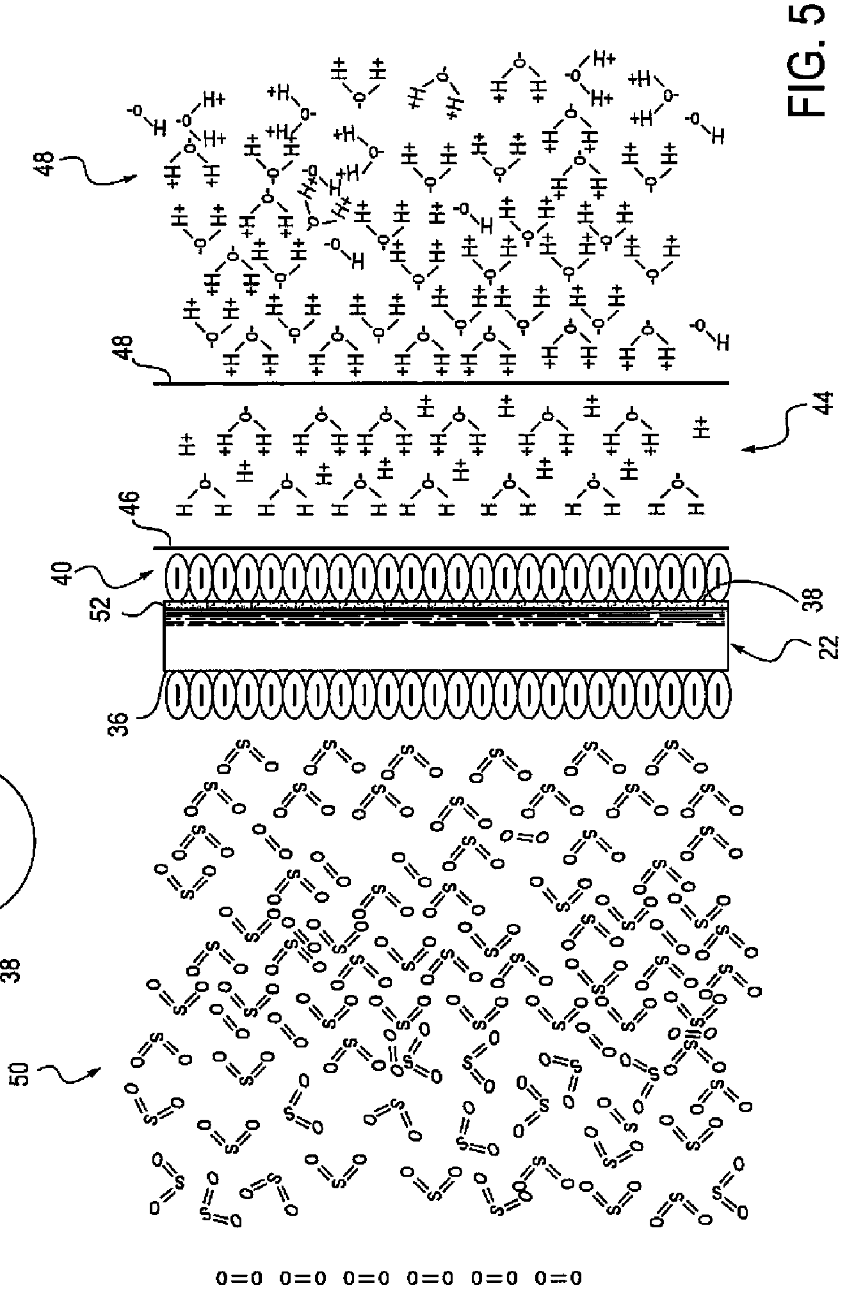
Figure 6:
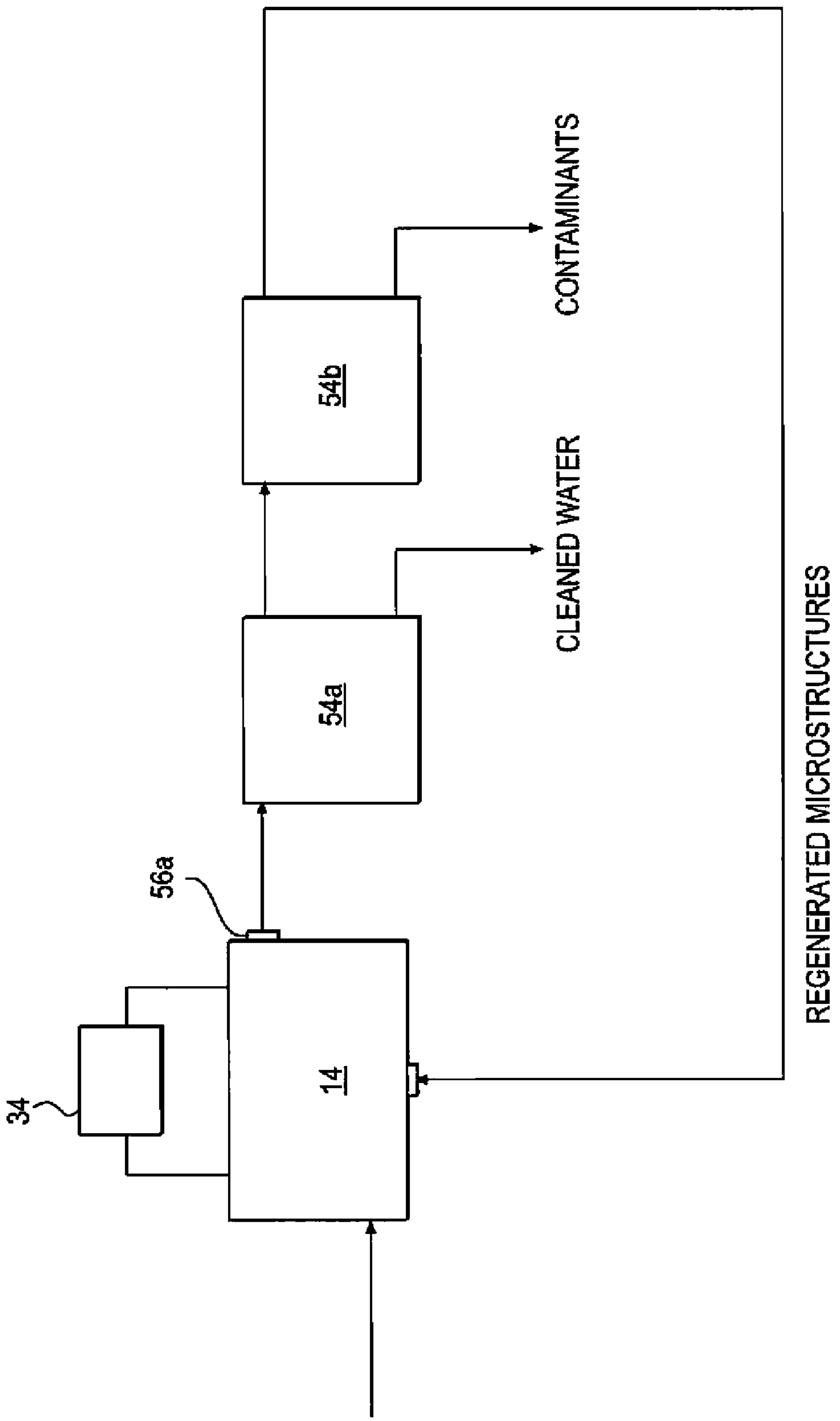
Figure 7:
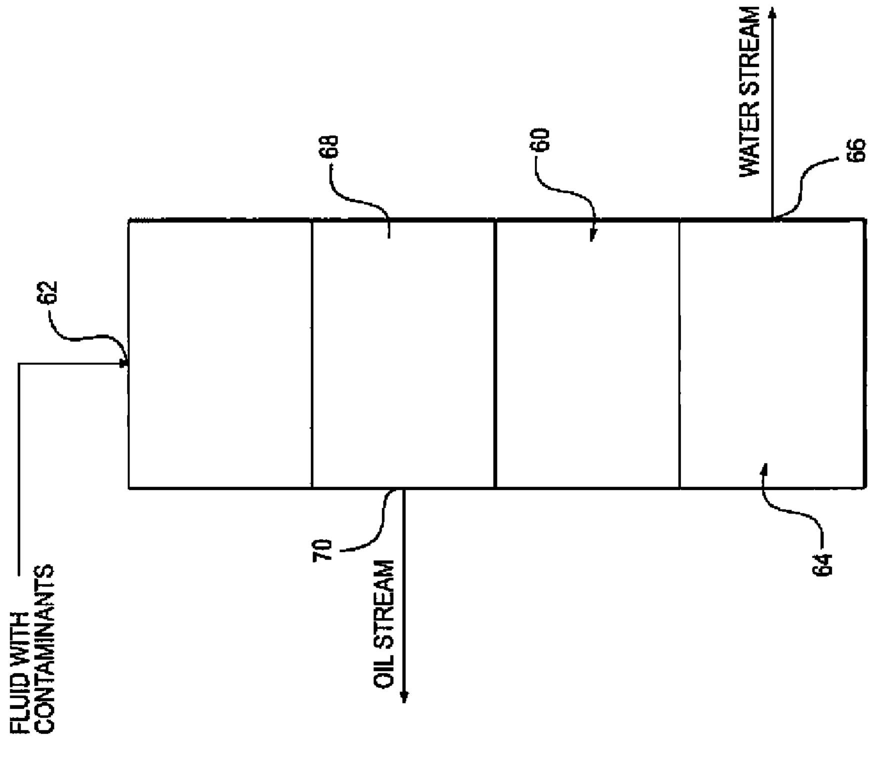

Having thus described the invention in general terms, reference will now be made to the accompanying drawings, which are not necessarily drawn to scale, and wherein:

FIG. 1 is a schematic diagram illustrating a system for removing contaminants from a fluid according to one embodiment of the present invention;

FIG. 2 is a schematic diagram illustrating a portion of the system of FIG. 1;

FIG. 2A is a schematic diagram illustrating a system according to another embodiment of the present invention;

FIG. 3 is a schematic diagram illustrating the system of FIG. 1, configured to perform a method of removing contaminants from produced water that results from an operation for producing crude oil or other hydrocarbons;

FIG. 4 is a cross-sectional view illustrating one of the microstructures of the system of FIG. 1;

FIG. 5 is a cross-sectional view partially illustrating the microstructure of FIG. 4, as indicated in FIG. 4;

FIG. 6 is a schematic diagram illustrating a system for removing contaminants from a fluid according to another embodiment of the present invention;

FIG. 7 is a schematic diagram illustrating a system for removing contaminants from a fluid according to another embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to the drawings and, in particular, to FIG. 1, there is schematically shown a system 10 for performing a method of removing contaminants from a fluid. As shown in FIG. 1, the system 10 can be configured to receive a contaminated fluid from a fluid source 12, process the fluid, and provide a cleaned fluid that is output from the system 10.

The system 10 can be used to clean a variety of fluids with different contaminant contents. For example, the system 10 can be used to clean the produced water that typically results from an operation for producing crude oil or other hydrocarbons. Alternatively, the system 10 can be used to clean other fluids, such as water or other liquids that contain contaminants. The contaminants in such fluids can include dissolved and/or suspended materials, such as one or more of the following: suspended particles of oil, other hydrocarbons, or any other materials; dissolved organic chemical compounds (including residual chemicals used in prior treatment operations) such as formate, acetate, propionate, butyrate, and valerate; dissolved inorganic salts, ions, and minerals, such as calcium, boron, carbonates, chlorides, hydroxides, sulfates, iron, magnesium, sodium, silicates, and nitrates, calcium ions ($Ca^{2+}$), calcium carbonate ($CaCO_3$), sodium ions ($Na^+$), chloride ions ($Cl^-$), mercury, arsenic, lead, sulfur, barium, strontium, naturally-occurring radioactive materials (NORM); and the like. In particular, the following contaminants are found in some produced water and are of interest for removal: suspended oil and grease particles; dissolved organics such as benzene, toluene, ethylbenzene, xylene, VFA, PAH, NPD; water soluble or suspended chemicals added in prior treatment operations such as demulsifiers and scale/corrosion inhibitors; suspended solids; dissolved inorganic salts; mercury; arsenic; lead; naturally-occurring radioactive materials; strontium; and/or barium.

The term "contaminant" is used herein to refer to materials that can be dissolved or suspended in the fluid. In some cases, the cleaned fluid can be free of contaminants or substantially free of contaminants. More typically, the cleaned fluid contains some contaminants but a lesser quantity of contaminants than the fluid provided from the fluid source. Indeed, in some cases, a certain amount of the contaminants may be acceptable or desired in the cleaned fluid that is output from the system 10, e.g., depending on the particular uses of the cleaned fluid. In particular, if the cleaned fluid is to be used as irrigation water for crops, a certain quantity of calcium and sodium may be acceptable.

The system 10 includes a container 14 that is configured to receive the fluid from the fluid source 12. For example, the container 14 can be a cylindrical or rectangular vessel that defines an inlet port 16 for receiving the fluid from the source 12 and an outlet port 18 for delivering the cleaned fluid therefrom. Alternatively, the container can be a fluid transmission device such as a pipeline, a naturally-occurring fluid container such as a pond, or the like. As shown in FIG. 2, baffles 20 or other structures can be provided in the container 14 so that the fluid flows along a circuitous route through the container 14 between the inlet and outlet ports 16, 18, e.g., so that the fluid is made to pass through a plurality of microstructures 22 in the container 14 and/or put in intimate contact with the microstructures 22. For example, first, second, and third baffles 20*a*, 20*b*, 20*c*, which are collectively referred to herein by reference numeral 20, can be planar structures extending partially through the container 14 to affect the flow of the fluid therethrough.

The fluid source 12 can be a hydrocarbon production operation, as shown in FIG. 3. In some cases, the fluid can be provided to an intermediate processing device 12*a* configured between the source 12 and the container 14. For example, the processing device 12*a* can be a separator that receives a production stream of water, oil, and gas from the hydrocarbon production operation and generally separates oil and gas from the stream. Hydrocarbons and/or gas can be directed from the separator for processing, and the remaining produced water, which can include some hydrocarbons such as oil, is directed to the input port 16 of the container 14.

A plurality of the microstructures 22 are disposed in the container 14 with the fluid. The microstructures 22 are small devices, typically formed of a solid material that defines a hollow, sealed interior space that is filled with a gas. The microstructures 22 can be capable of carrying an electric charge to attract contaminants that are present in the fluid. For example, the microstructures 22 can be microspheres, i.e., solid, porous, or hollow spherical (or generally spherical) particles that are made of ceramic, glass, plastic, or other materials, each having a diameter about in the range of 100 nanometer (nm)-500 micrometer (μm) and, more typically, in the range of 500 nm-250 μm, such as 500 nm-100 μm. In particular, the microstructures 22 can be hollow glass microspheres, such as those available from 3M of St. Paul, Minn. Such glass microspheres can be formed of a chemically-stable, soda-lime-borosilicate glass composition, which provides excellent water resistance and which are available in a variety of sizes and grades, crush strengths of up to 18,000 psig, and densities in the range of 0.10 to 0.70 g/cc. The wall thickness for hollow uncoated glass microstructures 22 can be about 1 micron. If the microstructures 22 are coated, the wall thickness can be about the same or greater.

In one embodiment, the microstructures 22 are hollow glass microspheres having an average diameter less than 250 μm, such as between about 10 μm and 100 μm. In such cases where the microstructures 22 are hollow structures, the hollow interiors of the microstructures 22 can contain air or other gases. For example, the microstructures 22 can be filled with a hypervalent gas, i.e., a gas having molecules with one or more atoms having more than eight valence electrons, such as sulfur dioxide. Alternatively, the microstructures 22 can be filled with a mixture of gases, such as a mixture of sulfur dioxide and oxygen. If gas is provided inside the hollow microstructures 22, the pressure of the gas can be less than (e.g., about ⅓ of) or more than atmospheric pressure. The density of the microspheres is typically less than the density of the fluid (e.g., less than water) so that the microstructures 22 float in the fluid. In particular, hollow glass microspheres can typically have a density between about 0.1 and 0.6 grams/cubic centimeter, such as about 0.15 g/cc. The bulk density of the microstructures may change during use. For example, if the microstructures 22 become fully or partially coated while cleaning the fluid, the microstructures 22 can become denser. In some cases, the microstructures 22 with the contaminants attached thereto can have a density greater than the fluid (e.g., greater than 1.0 g/cc) such that the microstructures 22 with the contaminants sink in the fluid.

The microstructures 22 are typically formed in a shape having a smooth outer surface, such as a spherical shape. The smooth, round shape of the microstructures 22 can increase the lubricity of the microstructures 22 so that the microstructures 22 exhibit little friction when moving and tend not to clog when flowing through pipes or other passages and tend to settle easily. In some embodiments, a coating is provided on the microstructures 22. The coating can be formed of a variety of materials, including metal or metal oxide coatings such as iron or iron oxide. If the microstructures 22 are formed of glass, the coating can be applied using materials such as silicon chemicals that contain both organic and inorganic reactivity in the same molecule, e.g., chlorosilane, aminosilane, or organofunctional silanes. Different types or configurations of microstructures, each coated with different materials to perform a different task, can be mixed together to form a bulk of microstructures 22. The microstructures 22 can also become coated with contaminants during the fluid cleaning process. The microstructures 22 need not be entirely devoid of an exterior coating (either applied prior to use or accumulated as attached contaminants) to remain effective in the fluid cleaning process. In other words, partially or entirely coated microstructures 22 can be used to remove contaminants from the fluid.

The microstructures 22 can form a layer in the fluid. In particular, if the microstructures 22 are less dense than the fluid and, thus, buoyant in the fluid, the microstructures 22 will tend to float to the upper surface 24 of the fluid in the container 14 and form a layer at the upper surface 24 of the fluid, as shown in FIG. 2. The microstructures 22 can be provided directly to the upper surface 24 of the fluid, or the microstructures 22 can be introduced into the container 14 at a level below the upper surface 24 and allowed to float to the upper surface 24, potentially contacting and collecting contaminants while rising in the fluid.

As shown in FIG. 2, the second baffle **20*b* can extend through the upper surface 24 of the fluid so that the baffle 20*b* defines first and second zones 26, 28 in the container 14, the layers of microstructures 22 in the first and second zones 26, 28 being substantially separated from one another. The first and third baffles 20*a*, 20*c* can extend from the bottom of the container 14 and upward into the microstructures 22 in the respective zones, separating each zone 26, 26 into portions 26*a*, 26*b* and 28*a*, 28*b*. Thus, as fluid with contaminants flows into the first zone 26, the fluid flows upward to the top of the first baffle 20*a* to pass from the first portion 26*a* of the first zone 26 into the second portion 26*b* of the first zone 26. In this way, the fluid flows through or proximate to the layer of microstructures 22 at the upper surface 24 in the first zone 26**.

Fluid passes below the second baffle **20*b*, from the second portion 26*b* of the first zone 26 to the first portion 28*a* of the second zone 28. Thereafter, the fluid flows upward to the top of the third baffle 20*c* to pass from the first portion 28*a* of the second zone 28 into the second portion 28*b* of the second zone 28. In this way, the fluid flows through or proximate to the layer of microstructures 22 at the upper surface 24 in the second zone 28**. In other embodiments, any number of baffles can be used to define any number of zones. Further, an electric charge can be applied from the distal zones of the container, or the charge can be applied at a plurality of zones throughout the container, e.g., with different types and/or sizes of electrodes.

Any number of microstructures 22 can be provided in the container 14, e.g., according to the size and configuration of the microstructures 22, the size and configuration of the container 14, the contaminant content of the fluid, the flow rate of the fluid through the container 14, the degree of cleaning of the fluid that is desired, and the like. For example, the microstructures 22 can be used in a quantity that is sufficient to maximize the likelihood of the contaminants impacting the microstructures 22 as the fluid moves through the container 14 and/or as the microstructures 22 rise through the fluid. In particular, the quantity of microstructures 22 can be sufficient to provide a volume percentage of the mixture (of the fluid and the microstructures 22) that corresponds to one minus the porosity of a packed volume of microstructures 22. It is believed that the efficiency of collisions between the microstructures 22 and the particles of contaminants generally increases with increasingly smaller microstructures 22 until the point at which the microstructures are as small as the particles of contaminants. Additionally, if the microstructures 22 are packed or ordered to some degree, the open area available to migrating flow of fluid is limited to the pore throat area between the microstructures 22. The microstructures 22 are typically measured by weight or volume, e.g., by providing a predetermined number of pounds of the microstructures 22 to the container 14. Thousands or millions of the microstructures 22 can be used in the container 14.

Further, the microstructures 22 can be provided as an application-specific mixture, e.g., a mixture of microstructures of different sizes, configurations, compositions, coatings, which can be designed to perform a specific operation, e.g., to attract and remove contaminants of a particular type.

If the container 14 defines different zones or areas, such as the different zones 26, 28 defined between the baffles 20 of FIG. 2, the microstructures 22 can be selectively provided in the different zones 26, 28. For example, the microstructures 22 can be provided in some of the zones 26, 28 but not others, different amounts of the microstructures 22 can be provided in the different zones 26, 28, and/or microstructures 22 of different types or characterizations can be provided in the different zones 26, 28. In particular, as shown in FIG. 2, the microstructures 22 in the first zone 26 can be provided to define a layer (as measured vertically in FIG. 2) that is generally thicker than the microstructures 22 in the second zone 28. Further, microstructures 22 of a first size (or other characterization, such as composition, coating, or the like) can be provided in the first zone 26, and microstructures 22 of a second size (or other characterization, such as composition, coating, or the like) can be provided in the second zone 28. If the microstructures 22 in the second zone 28 are smaller than the microstructures 22 in the first zone 26, the microstructures 22 in the second zone 28 can tend to pack more closely together and define smaller spaces through which the fluid must pass therebetween and thereby provide a smaller filtering effect than the microstructures 22 in the first zone 26 so that the fluid is successively filtered through smaller passages in the zones 26, 28.

The mixture of the microstructures 22 and the contaminants attached thereto can be separated from the fluid in various ways, such as by gravity separation, i.e., a process that makes use of the difference in gravity between the microstructures 22 (having contaminants attached thereto) and the fluid in order to separate the microstructures 22 from the fluid. In this regard, it is noted that, depending on the quantity of contamination of the fluid, the specific gravity of the microstructures 22 and contaminants attached thereto can be less, and in some cases significantly less, than the clean fluid (e.g., water). For example, heavy oil is characterized by a density that is only slightly different than that of water. Therefore, particles of heavy oil in water tend to separately relatively slowly from the water in conventional separation operations, with smaller particles of oil or other contaminants generally rising slower than larger particles, and less dense particles rising faster than heavier particles. On the other hand, when buoyant microstructures 22 are mixed with the fluid and attach to the contaminants, the combined microstructures 22 and contaminants can have a density that is considerably less than the fluid so that the microstructures 22 lift the contaminants to the surface 24 of the fluid relatively quickly. For example, the density of the combination of oil attached to hollow glass microspheres can be about 50% of the density of the oil and, thus, less than 50% of the density of water. It is appreciated that microstructures 22 with contaminants attached thereto may have a greater overall density than microstructures 22 that do not have contaminants attached thereto. For purposes of this application, the term "upper surface" is used to refer to a region proximate the top of the fluid.

Alternatively, a cyclonic operation can be used to separate the lighter mixture of microstructures and contaminants from the heavier fluid. A cyclonic operation can be performed by using a hydro-cyclone unit or a centrifuge to provide centrifugal forces for separation. For a mixture of microstructures 22 and attached contaminants having a typical density in the range of about 0.1 to 0.5 g/cc, the microstructures 22 and attached contaminants can be separated from water by forces that are generally less than those required to remove the contaminants from the microstructures 22. Thus, the contaminants can remain stuck to the microstructures 22 during the separation of the microstructures 22 from the fluid, thereby removing the contaminants from the fluid.

In other embodiments, the attachment of the contaminants to the microstructures 22 can sufficiently increase the density thereof such that the microstructures 22 with the contaminants attached thereto are heavier than the fluid and sink in the fluid, e.g., to be removed from the bottom of the container 14.

The microstructures 22 can be oleophilic, i.e., have a strong affinity for oil rather than water, such that the microstructures 22 can attract and collect oil and/or other contaminants in the fluid. The oleophilic nature of the microstructures 22 can result from the composition of the microstructures 22 and/or an electric charge provided to the microstructures 22 and/or the fluid. In particular, contaminants such as small solids and oil droplets, which can be inherently charged particles, can be attracted and attached to glass microstructures 22 in the fluid. The oleophillic nature of the microstructures 22 can be modified and enhanced through the addition of a surface coating as previously described. Also, different types of contaminants can be targeted for removal through the use of a mixture of microstructures 22 that are prepared with different coating types.

In one embodiment, an electric charge is provided on the microstructures 22 so that at least some of the contaminants in the fluid are attracted to the microstructures 22. For example, as shown in FIGS. 1 and 2, the electric charge can be established and maintained on the microstructures 22 by applying an anode 30 and a cathode 32 in contact with the fluid. The anode 30 and cathode 32 are electrically conductive devices that are connected, respectively, to the negative and positive terminals of a DC power source 34, such as a rectifier that converts AC power to DC power or an electric battery. The anode 30 and cathode 32 can be disposed in the same zone or, as shown in FIG. 1, in different zones or locations in the container 14 and placed in contact with the fluid. The electric potential that exists between the anode 30 and cathode 32 provides an electric potential through the fluid in the container 14 so that an electric charge is applied through the fluid between the anode 30 and cathode 32 to the microstructures 22. The electric charge on the microstructures 22 provides an attraction for the contaminants in the fluid so that the contaminants are attracted to the microstructures 22 and tend to become adhered to the microstructures 22. Thus, contaminants in the fluid tend to be attracted and adhered to the microstructures 22, and the fluid becomes cleaner as the microstructures 22 remove the contaminants therefrom. The position of the anode 30 and cathode 32 can be switched, and, in some cases, the anode 30, cathode 32, and power source 34 can be omitted from the system 10. If an electric charge is provided to the microstructures 22, some of the contaminants may be oxidized or reduced, and these redox reactions can contribute to the production of a vapor or a solid. As shown in FIG. 2A, a port 56*b* can be provided at or proximate to the top of the container 14 for the removal of vaporous material, and a port 56*c* can be provided at or proximate to the bottom of the container 14 for removal of solid materials (sediments).

In some cases, the microstructures 22 can increase the conductivity and/or pH of the fluid. For example, glass microstructures 22 can be negatively charged such that the microstructures 22 naturally attract protons. The electronegativity of the microstructures 22 can also be enhanced by the contents of the microstructures 22 (if hollow) and/or by the other physical characteristics and orientation of the microstructures 22. For example, if the microstructures 22 are hollow glass spheres filled with a mixture of sulfur dioxide and oxygen, negatively charged particles within the microstructures 22 can attract and retain hydrogen ions (H+) from the fluid, thereby shifting the equilibrium of the fluid toward a greater concentration of hydroxide ions (OH−). In one embodiment, the pH of water can be changed in this way to about 9.5 by the addition of microstructures 22 formed of hollow glass. In some cases, the microstructures 22 can be used to achieve a pH level in the fluid that is sufficient to prevent the growth of bacteria or other organisms. Thus, the microstructures 22 can be added to a fluid of nearly any kind (and charged in the fluid if desired) in order to create an environment in which biological activity is reduced or eliminated, e.g., to reduce or eliminate bacteria in the fluid.

In the case of microstructures 22 that are hollow glass spheres filled with a mixture of sulfur dioxide and oxygen, as shown in FIG. 4, the inner surface 36 of each microstructure 22 is exposed only to the contained mixture of sulfur dioxide and oxygen, and some sulfur dioxide can be held along the inner surface 36 of the microstructure 22. The amount of sulfur dioxide that is held at the inner surface 36 can be a function of the amount of energy that is stored in the microstructure 22. A portion of the microstructure 22 is illustrated in FIG. 5. For clarity of illustration and explanation, the portion of the microstructure 22 shown in FIG. 5 is shown to be planar, but it is appreciated that the inner and outer surfaces 36, 38 of the microstructure 22 can be curved, e.g., for the spherical microstructure 22 of FIG. 4. Similarly, although the term "plane" is used herein to refer to demarcations between the regions of space near the microstructure 22, it is appreciated that the "planes" and the adjacent regions may be curved to correspond to the shape of the microstructure 22.

As shown in FIG. 5, a first or inner Helmholtz plane 40 outside the microstructure 22 defines a transition between a first layer or zone 42 of fluid that is proximate the microstructure 22 and that can contain charged particles, which are attracted to the charged surface of the microstructure 22. Outward from the first layer 42, a second layer 44 can be generally "charge balanced." A second or outer Helmholtz plane 46, further outside the microstructure 22, defines the transition between the charge-affected (balanced) zone 44 and the less affected fluid outside the microstructure, generally indicated by reference numeral 48 in FIG. 5. The outer Helmholtz plane 46 generally defines a transition where oxidation and reduction (i.e., transfer of electrons) reactions occur. It is believed that, as energy is transferred across the zone 44 and plane 46 (for example from particle to particle), some of the energy is absorbed by the surrounding material. Therefore, using many microstructure 22s 22 (e.g., 15 billion per liter of fluid), with each microstructure 22 behaving like an individual electrode, can cause an increase in the efficient use of energy to promote reactions. Also, and in part due to the activity of the gas contained within the microstructures 22, the microstructures 22 can act as capacitors and can take on and store energy. In this regard, the microstructures 22 could exhibit the electrode and exterior layering behavior even if the microstructures 22 are solid glass; however, if the microstructures 22 are hollow and filled with a reactive gas, the magnitude of the charged layers can potentially be increased so that, if more energy is added and stored by the reordering of the interior gas, indicated by reference numeral 50 in FIG. 5, then the magnitude and effect of the charged layers can be further enhanced. Also, if the exterior surface 38 of each microstructure 22 is defined by a coating 52, energy released from the microstructure 22 can occur through the coating 52. Energy released through such the coating 52 can enhance the activity and effect of the microstructures 22.

For example, a phenol coating, which can be applied by known organosilane chemistry methods, can result in a surface with properties that are enhanced by the electrochemical behavior of the sulfur dioxide and oxygen mixture inside the microstructure 22 to attract organic material. By artificially energizing the phenol, its attraction for organics can be increased, so that the microstructures 22 adhere to dispersed and dissolved organic materials in the fluid. Various other organo-function coatings can be applied to the microstructures 22 depending on the intended use of the microstructures 22. For example, if the microstructures 22 are to be used to remove aromatics from produced water, the microstructures 22 can be provided with an "aromatic-like" surface coating, such as phenyltrimethoxysilane. Alternatively, if the microstructures 22 are to be used to remove carbon dioxide and/or hydrogen sulfide from produced water, the microstructures 22 can be provided with an amino silane coating. If the microstructures 22 are to be used to remove organics from produced water, the microstructures 22 can be provided with a coating of phenol, vinyl, or other oleophilic molecules.

The contact of microstructures 22 with one another can disrupt the charged conditions thereof. For example, if two microstructures 22 that are unequally charged with energy contact, an energy transfer can occur between the two microstructures 22. Thus, when microstructures 22 accumulate spatially and come into contact with each other, the effect can be to unitize the microstructures 22 with a continuous (or substantially continuous) coating of fluid. In this way, the microstructures 22 share and distribute energy stored therein while the fluid layers around each microstructure 22 behave as described above.

In some cases, the microstructures 22 may be allowed to float together in the fluid and accumulate in a mass or matrix, e.g., on the surface of the fluid. With the microstructures 22 formed in such a mass and in contact with one another, the mass of microstructures 22 can provide a strong barrier to permeability such that, even if the mass has a high porosity, the fluid may not readily flow through the mass of microstructures 22. The resistance to flow of fluid through the mass may be further increased if the microstructures 22 are packed or forced together, e.g., by the buoyancy of the microstructures 22, and/or if additional energy is supplied such that a fluidic seal is provided between the microstructures 22. Alternatively, greater mixing of the microstructures with the fluid can be achieved by continuously circulating the microstructures 22 with or in the fluid. For example, the microstructures 22 can move with the fluid as the fluid circulates through the container 14, circulation in the container 14 can be induced, and/or the microstructures 22 can move through the fluid due to a difference in density between the microstructures 22 and the fluid.

As noted above, the microstructures 22 can store energy and act as capacitors. The microstructures 22 can be inherently charged, and additional polarization can be induced during the conversion of kinetic energy to potential energy or using an applied external electrical force field. For example, if the microstructures 22 are included in a fluid that is a mixture of oil and water, and the microstructures 22 are pumped with the fluid through a pipeline, such as the pipelines shown in FIG. 1 that connect the container 14 to a regeneration device 54, some of the kinetic energy of the movement of the microstructures 22 can be collected and released to the surrounding fluid and pipeline. In some cases, cathodic protection to the pipeline can be achieved as the pump power is converted to static electricity in this way. For example, if the exterior of the pipeline is insulated from ground (e.g., by a coating on the pipeline), the pipeline can be charged by the movement of the capacitor-like microstructures 22 moving therethrough to establish a charge on the pipeline that provides cathodic protection, e.g., to prevent corrosion of the pipeline.

In some cases, the microstructures 22 can be used to retain a material that is reacted while adhered to the microstructures 22. For example, an electric charge can be provided on the microstructures 22 so that the microstructures 22 retain a material on the outer surfaces thereof. The microstructures 22 with the retained material can be provided in a fluid so that the material reacts with a contaminant in the fluid while the material remains adhered to the microstructures 22. In particular, microstructures 22 formed of hollow, glass spheres, which are either coated or uncoated, can be used to attract and adhere iron oxide. The microstructures, with the adhered iron oxide, can be provided in a fluid.

As indicated in FIG. 2, the fluid flows successively through the zones 26, 28 of the container 14 and is successively cleaned. In particular, as the fluid flows through the layer of microstructures 22 at the upper surface 24 in the first zone 26, the contaminants in the fluid are attracted to and adhered to the microstructures 22 in that layer so that the fluid is generally cleaner when flowing out of the first zone 26 than when flowing into the first zone 26. The fluid then flows into the second zone 28 and through the layer of microstructures 22 at the upper surface 24 of the second zone 28 so that contaminants in the fluid are attracted to and adhered to the microstructures 22 in that layer and the fluid is cleaned further. Thus, the fluid is generally cleaner when flowing out of the second zone 28 than when flowing into the first or second zones 26, 28. The contaminants that are removed from the fluid are trapped in the layers of microstructures 22.

Various types of contaminants can be removed from the fluid, including contaminants in solid, liquid, or gaseous phases. For example, the microstructures 22 can attract and retain solid particles from the fluid, such as solid particles of minerals or organic materials. In some cases, the fluid can include gaseous bubbles and/or liquid globules. For example, if the fluid is produced water from a hydrocarbon production operation, the fluid may include water with bubbles of air, natural gas, or other gases therein, and/or globules of liquid hydrocarbons or other liquids therein. Such gaseous bubbles and liquid globules can be attracted to the microstructures 22 and adhered thereto so that the gaseous, liquid, and/or solid contaminants in the fluid can be removed along with the microstructures 22 from the fluid. It is believed that the microstructures 22, either coated or uncoated, can be used to adhere and retain a variety of different contaminants, included dissolved and/or suspended materials such as one or more of the following: oil or other hydrocarbons; minerals, such as calcium, boron, carbonates, chlorides, hydroxides, sulfates, iron, magnesium, barium, strontium, sodium, silicates, and nitrates; organic materials, such as formate, acetate, propionate, butyrate, and valerate; and the like, which can exist in solid, liquid, and/or gaseous phases in the fluid.

The cleaned fluid can be removed from the container 14, e.g., by discharging the fluid from the container 14 through the outlet port 18. The port 18 is typically configured to discharge the fluid without discharging the microstructures 22. In this way, the microstructures 22 with the contaminants attached thereto can be retained in the container 14, and the fluid is separated from the microstructures 22 and the contaminants, thereby removing the contaminants from the fluid so that the fluid is cleaned. In some cases, a filter can be provided at the port 18 to filter the fluid that is discharged through the port 18 so that microstructures 22 in the fluid are retained in the container 14. In addition, or alternative, the port 18 can be disposed at a position in the container 14 where microstructures 22 are unlikely to occur. In particular, if the microstructures 22 are configured to float in the fluid, the port 18 can be configured to receive fluid from the bottom of the container 14 where few or no microstructures 22 are present. For example, as shown in FIG. 2, the port 18 can be located proximate the bottom of the container 14. Alternatively, in the system 10 illustrated in FIG. 2A, the container 14 does not include baffles, and port 18 is configured to receive fluid from a level in the container where the microstructures 22 are present so that the microstructures filter the fluid flowing toward the port 18 to reduce or eliminate contaminants in the fluid that exits the port 18. In another embodiment, the port 18 can be provided at any convenient vertical location in the container 14, and a baffle in the container 14 can be structured to prevent the microstructures 22 from floating toward the port 18, i.e., so that fluid without microstructures 22 flows below the baffle and to the outlet port 18.

In some cases, the microstructures 22 can be regenerated, i.e., cleaned of contaminants, so that the microstructures 22 can be reused for additional operations of cleaning the fluid. For example, in one embodiment, the microstructures 22 can be removed from the container 14, subjected to a regeneration operation in a regeneration or cleaning device 54, and then returned to the container 14 for reuse. The removal of the microstructures 22 from the container 14 can be performed manually, or the regeneration device 54 can automatically receive the microstructures 22 from the container 14, regenerate the microstructures 22, and provide the microstructures 22 back to the container 14 so that the microstructures 22 can be reused in a subsequent operation for cleaning fluid in the container 14. In particular, as shown in FIG. 1, the regeneration device 54 can be configured to receive a mix of microstructures 22 and fluid from a port 56*a* positioned below or proximate to the upper surface 24 of the fluid, where the microstructures 22 tend to collect if buoyant in the fluid. In addition, or alternative, the regeneration device 54 can be configured to receive microstructures 22 and fluid from ports 56*b*, 56*c* at the top and bottom of the container 14. The contaminants can be removed from the fluid by first removing the microstructures 22 from the fluid in the container 14, typically with at least a small amount of the fluid, and subsequently cleaning the microstructures 22 to remove the contaminants therefrom before returning the microstructures 22 to the container 14 for re-use. Thus, the cleaning or regeneration of the microstructures 22 results in removal of contaminants from the fluid, and the subsequent and repeated re-use and regeneration of the microstructures 22 can result in the removal of additional contaminants from the fluid.

The regeneration operation can be performed in various ways. For example, in some cases, the regeneration device 54 can be a cyclonic device that is configured to remove the contaminants from the microstructures 22 by subjecting the microstructures 22 to a cyclonic operation. In addition, or alternative, the microstructures 22 can be regenerated by microwaving or otherwise heating the microstructures 22, washing the microstructures 22, subjecting the microstructures 22 to a chemical cleaning process, and/or vibrating the microstructures 22. For example, the microstructures 22 can be heated, e.g., by subjecting the microstructures 22 to microwaves, to thereby weaken the adhesive attraction of the contaminants to the microstructures 22 so that another separation operation can be performed. In some cases, a heating operation can be used to sufficiently heat the microstructures 22 (e.g., to 500-600° C.) to vaporize the contaminants. If the microstructures 22 are provided with an outer coating, e.g., a metal coating, such a heating operation may result in the removal of the coating from the microstructures 22, such that recoating may be required before reuse of the microstructures 22.

In another regeneration operation, the microstructures 22 are received into an electrolytic cell, where an oxidation operation is performed to convert organic contaminants on the microstructures 22 to carbon dioxide and water. Some of the contaminants may also separate from the microstructures 22 to form a separate polarized liquid phase, which can be removed, e.g., by skimming the liquid contaminants from the microstructures 22.

The microstructures 22 need not be completely cleaned of all contaminants to be subsequently effective. In other words, some fraction of the contaminants can remain attached to the microstructures 22 even after the regeneration operation is completed, and the microstructures 22 can nevertheless be effective for removing additional contaminants from the fluid.

After the contaminants are removed from the microstructure 22 in the regeneration operation, the contaminants can be delivered through a contaminant port 58*a* for recovery (e.g., for processing and/or use of recovered hydrocarbons) or disposal. In some cases, one or more ports can be provided for delivering the contaminants from the regeneration device 54, e.g., ports 58*a*, 58*b*, 58*c*, as shown in FIG. 2A. For example, as shown in FIG. 2A, vapors and low density contaminants can be removed through port 58*b* at or proximate to the top of the regeneration device 54, and/or sediments or high density contaminants can be removed through port 58*c* at or proximate to the bottom of the regeneration device 54. After the regeneration operation, the microstructures 22 can be returned to the container 14, e.g., by recirculating the cleaned microstructures to an inlet port 59 of the container 14. In some cases, the inlet port 59 can be near the bottom of the container 14 so that the microstructures 22 rise from the port 59 to the surface 24 of the fluid and collect contaminants while rising through the fluid. Alternatively, as shown in FIG. 2A, the inlet port 59 can be positioned at the top of the container 14, and the port 56*a*, for removing the microstructures and contaminants from the container 14, can be provided at a lower position, e.g., close to the bottom of the layer of microstructures 22 as illustrated in FIG. 2A.

It is appreciated that the microstructures 22 can be used without the addition of chemicals, thereby saving costs and potentially allowing the contaminants (e.g., hydrocarbons) to be recovered.

The regeneration of the microstructures 22 can be performed in a single regeneration device 54 or in multiple steps performed in different devices. For example, as illustrated in FIG. 6, the microstructures 22 with contaminants attached thereto can be delivered from the container 14 to a first regeneration device 54*a* that performs a first regeneration operation for separating fluid (e.g., cleaned water) from the microstructures 22. The microstructures 22 with contaminants still attached thereto can then be delivered from the first regeneration device 54*a* to a second regeneration device 54*b* that performs a second regeneration operation for separating contaminants (e.g., oil) from the microstructures 22. The cleaned water from the first regeneration device 54*a* and the contaminants from the second regeneration device 54*b* can be output therefrom and used, discarded, or otherwise processed. The cleaned microstructures 22 can be recirculated from the second regeneration device 54*b* to the container 14 for subsequent use in cleaning of the fluid therein.

If the microstructures 22 are subjected to multiple regeneration operations before being returned to the container 14, either in one regeneration device or multiple regeneration devices, the successive regeneration operations can be different. For example, in some cases, the microstructures 22 can be subjected to a first separation cycle (such as a cyclonic operation) to separate the fluid, and the microstructures 22 can then be subjected to a second separation cycle (such as another cyclonic operation) to separate the contaminants. The cyclonic operations can be performed in the same device 54 or in separate devices 54*a*, 54*b*. If cyclonic operations are to be used for both separating the microstructures 22 (with attached contaminants, such as oil and oil-wetted particles) from the fluid and separately for separating the microstructures 22 from the contaminants, the second operation of separating the microstructures 22 from the contaminants is typically characterized by higher cyclonic forces since the contaminants are typically more difficult to remove from the microstructures 22.

In some cases, the microstructures 22 can be used continuously without the need for removal for regeneration. For example, as illustrated in FIG. 7, the microstructures 22 can be provided as a horizontal layer 60 in a container 14. The layer of microstructures 22 can be defined throughout all or most of the container 14, e.g., generally from the top of the container 14 to the bottom of the container 14, or only within a designated portion of the container below the top of the container 14 and/or above the bottom of the container 14. If the microstructures 22 are to be maintained in only a portion of the container 14, the location of the microstructures 22 can be controlled by mechanical screens placed above and/or below the layer of microstructures 22, by the buoyancy of the microstructures 22, or otherwise. In either case, fluid with contaminants (such as produced water that is a mixture of water and oil) can be introduced through an input port 62 at the top of the container 14 so that the fluid flows downward at least partially through the layer 60 of the microstructures 22. As the fluid passes through the layer 60 of microstructures 22, oil or other contaminants in the fluid can be retained by the microstructures 22. Thus, if the fluid is a produced water mixture containing water and oil, the water can flow through the layer 60 of microstructures 22 to a water-rich layer 64 at the bottom of the container 14. Clean water can exit the container 14 via a first outlet or port 66 that is defined by the container 14 proximate the water-rich layer 64. As oil is retained by the microstructures 22 and the amount of oil in the layer 60 of the microstructures 22 increases, the oil can coalesce in the layer 60 and form droplets of sufficient size to separate from the microstructures 22. Such droplets of oil can rise into an oil-rich layer 68 that is within or above the layer of microstructures 22. Oil can exit the container 14 via a second outlet or port 70 that is defined by the container 14 proximate the oil-rich layer 68. In this way, the microstructures 22 can provide a filtering effect to the fluid, and the contaminants (e.g., oil) can be self-cleaning from the microstructures 22.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for removing contaminants from a fluid, the method comprising:
   providing a plurality of microstructures in a fluid, the microstructures defining hollow, sealed interior spaces that are filled with a gas and being capable of carrying an electric field;
   providing an electric charge on the microstructures such that at least some of the contaminants in the fluid are attracted to the microstructures and attached to the microstructures; and
   separating the microstructures with the contaminants attached thereto from the fluid, such that the contaminants are removed from the fluid.

2. A method according to claim 1 wherein the step of providing the plurality of microstructures comprises providing hollow, generally spherical glass microstructures having an overall density less than the fluid.

3. A method according to claim 2 wherein the step of providing the plurality of microstructures comprises providing a coating on the microstructures.

4. A method according to claim 1 wherein the step of providing the plurality of microstructures comprises providing at least 1000 of the microstructures.

5. A method according to claim 1 wherein the step of providing the plurality of microstructures comprises providing microstructures having a diameter of less than 250 micrometers.

6. A method according to claim 1 wherein the step of separating the microstructures with the contaminants attached thereto from the fluid comprises removing liquid hydrocarbon from the fluid with the microstructures.

7. A method according to claim 1 wherein the step of separating the microstructures with the contaminants attached thereto from the fluid comprises removing solid contaminants from the fluid with the microstructures.

8. A method according to claim 1, further comprising, subsequent to the separating step, regenerating the microstructures to remove the contaminants therefrom and re-using the microstructures to remove additional contaminants from the fluid.

9. A method according to claim 1, wherein the step of separating the microstructures from the fluid comprises removing the microstructures from an upper surface of the fluid and removing the fluid from a position proximate a bottom of a container holding the fluid.

10. The method of claim 1 wherein the fluid is produced water containing hydrocarbon contaminants.

11. The method of claim 1 wherein:
   the microstructures float to the top the fluid and are removed thereby removing the microstructures with the contaminants attached to the microstructures.

12. The method of claim 1 wherein:
   the microstructures are generally spherical in shape.

13. The method of claim 1 wherein:
   the fluid is in a vessel and the microspheres float up in the fluid and freely float on the top of the fluid.

14. The method of claim 1 wherein:
   the contaminants which are attached include gases.

15. The method of claim 1 wherein:
   the fluid is in a vessel and fluid remains generally stationary and the microstructures move relative to the fluid.

16. The method of claim 1 wherein:
   the microstructures are glass.

17. The method of claim 1 wherein:
   the microstructures attract and attach contaminants including hydrocarbons from the fluid which is in a stationary vessel;
   the combined microstructures and hydrocarbons are removed from the fluid;
   the microstructures are separated from the hydrocarbons; and
   the microstructures with the hydrocarbons separated therefrom are reintroduced into the fluid to further remove hydrocarbons from the fluid.

18. The method of claim 1 wherein:
   the electrical charge is applied to the fluid with the microstructures electrically attracting and adhering contaminants including hydrocarbons to the microstructures.

19. A method for removing contaminants from a fluid, the method comprising:
   providing a plurality of microstructures in a fluid, the microstructures defining hollow, sealed interior spaces that are filled with a gas and being less dense than the fluid so that the microstructures float when places in the fluid and are capable of carrying an electric field;
   providing an electric charge on the microstructures such that at least some of the contaminants in the fluid are attracted to the microstructures and attached to the microstructures; and
   separating the microstructures with the contaminants attached thereto from the fluid, such that the contaminants are removed from the fluid.

20. The method of claim 19 wherein the fluid is produced water containing hydrocarbon contaminants.

* * * * *